United States Patent [19]

Couet

[11] Patent Number: 5,509,445
[45] Date of Patent: Apr. 23, 1996

[54] CHECK VALVE FOR A DISCHARGE AIR DUCT

[75] Inventor: Léon-Pierre Couet, Quebec, Canada

[73] Assignee: Jean-Marc Lamoureux, Quebec, Canada

[21] Appl. No.: 481,260

[22] PCT Filed: Aug. 5, 1994

[86] PCT No.: PCT/CA94/00458

§ 371 Date: Jun. 30, 1995

§ 102(e) Date: Jun. 30, 1995

[87] PCT Pub. No.: WO95/12775

PCT Pub. Date: May 11, 1995

[30] Foreign Application Priority Data

Nov. 1, 1993 [CA] Canada ................. 2.102.168

[51] Int. Cl.[6] .................................... F16K 15/04
[52] U.S. Cl. ........................ 137/533.11; 454/359
[58] Field of Search ............... 137/533.11, 533.13, 137/533.15; 454/359

[56] References Cited

U.S. PATENT DOCUMENTS 841,474  1/1907  Wendelken .............. 137/533.11
4,263,936  4/1981  Brown .
4,624,176  11/1986  Steinke .................. 137/533.11

FOREIGN PATENT DOCUMENTS 2222230  2/1990  United Kingdom .............. 137/533.11

Primary Examiner—Robert G. Nilson
Attorney, Agent, or Firm—Willian Brinks Hofer Gilson & Lione

[57] ABSTRACT

Valve (10) comprising a housing (20) with an air inlet (23) mounted at the end of a discharge air duct of a domestic appliance, and with an air outlet (24) communicating with the outside. The valve (10) includes a shoulder (41) sealed to the air inlet (23). A ball (42) is received in the housing (20) and is movable on a guide (43 between first and second positions. When there is no airflow from the duct (60), the ball sealingly engages the shoulder (41) under gravity so as to prevent air from being introduced into the duct from outside through gusts of wind. The shoulder (41) and the ball (42) can be made from an insulating material in order to reduce conductive heat loss in cold weather. When the domestic appliance is operating, the ball (42) moves towards the second position under the discharge airflow in order to evacuate said airflow. As soon as the appliance is stopped, the ball (42) resumes automatically its initial position. The valve (10) may be advantageously mounted on any forced air outlet that can be found on various devices, such as air outlets for driers, for toilet ventilating devices, for air exchangers or kitchen hoods, to replace conventional pivoting valves.

3 Claims, 3 Drawing Sheets

CHECK VALVE FOR A DISCHARGE AIR DUCT

FIELD OF THE INVENTION

The present invention relates to the field of air vents for domestic apparatuses comprising a forced air outlet, as for example dryers, toilet fans, air exchangers, cooker hoods. More precisely, the present invention is directed to a valve for a discharge air duct which particularly allows to efficaciously reduce the thermic energy loss towards the exterior of the conduits.

BACKGROUND ART

Presently on the market, there are different types of contaminated air vent systems allowing, notably, to discharge contaminated air from certain domestic apparatuses towards the outside of buildings. In general, these systems comprise, at their outlet, a pivoting valve closing the opening of this outlet such that the penetration of the air coming from the outside and which is generally caused by wind gusts is reduced. However, these valves are not very efficacious. The air penetration into the ducts then causes the loss of thermic energy, particularly during cold weather. Moreover, also in cold weather, the heat loss towards the exterior caused by conduction around a vent system with a pivoting valve is only slightly reduced.

Therefore, there is a need for an air vent system having the object of not only discharging contaminated air towards the exterior, but also to substantially reduce the penetration of outside air in the ducts due to the wind gusts in the ducts, and to reduce the heat loss due to conduction towards the exterior of the ducts during cold weather.

BRIEF DESCRIPTION OF THE INVENTION

An object of the present invention is to provide a valve for a discharge air duct which substantially reduces the penetration of air in the discharge air ducts due to wind gusts. This valve may also reduce the heat loss caused by conduction towards the exterior of the duct.

More particularly, the object of the present invention is to provide an air evacuation system comprising a valve having a housing provided with a air outlet and an air inlet fixed at the end of the discharge air duct, which duct may be directly or indirectly connected to the air outlet duct of a domestic apparatus or any similar apparatus. The valve is characterized in that it comprises, inside the housing, a shoulder hermetically connected to the air inlet of the valve. A ball provided in the housing is moving between a first and a second position while following a guide. When no air flow is coming from the duct, the ball is leaning by gravity against the retaining wall, and this, in a substantially hermetic manner for preventing any penetration of air in the duct from the outside due to wind gusts.

When the domestic apparatus is on, the ball is moving to the second position due to the contaminated air flow. In the second position, the ball is remote from the shoulder and is above the level of the first position so that it may go back there by gravity when the contaminated air flow is stopped.

Preferably, the valve also comprises a seat against which the ball is leaning while it is in second position, the seat being provided with at least one opening to the exterior of the housing. Due to the pressure differential between the interior and the exterior of the housing, the ball is maintained stable in the second position.

The housing may also be provided with a double wall. This double wall comprises an interior wall, an outside wall and a hollow passage between the two walls, this passage emerging beside the air outlet which is preferably provided with a protecting wire netting.

Preferably, the ball and the retaining wall are made with an insulating material such that the heat inside the duct cannot escape towards the exterior. Moreover, the seat is preferably located in a cover hermetically adapted to the housing.

INDUSTRIAL APPLICATIONS

The air vent being the object of the present invention may advantageously apply to any forced air outlet found presently on the market, such as dryer air outlets, toilet fans, air exchangers or cooker hoods.

DESCRIPTION OF THE DRAWINGS

The features of the present invention will be better understood with the following non restrictive description of a preferred embodiment made with reference to the appended drawings described hereinafter and in which.

BEST MODE FOR CARRYING OUT THE INVENTION

The following description, given with reference to the appended drawings, sets forth the best mode in view of the inventor to carry out the invention in a commercial environment. However, it is to be understood that many modifications may be effected without departing from the scope of the invention.

Figure 1:
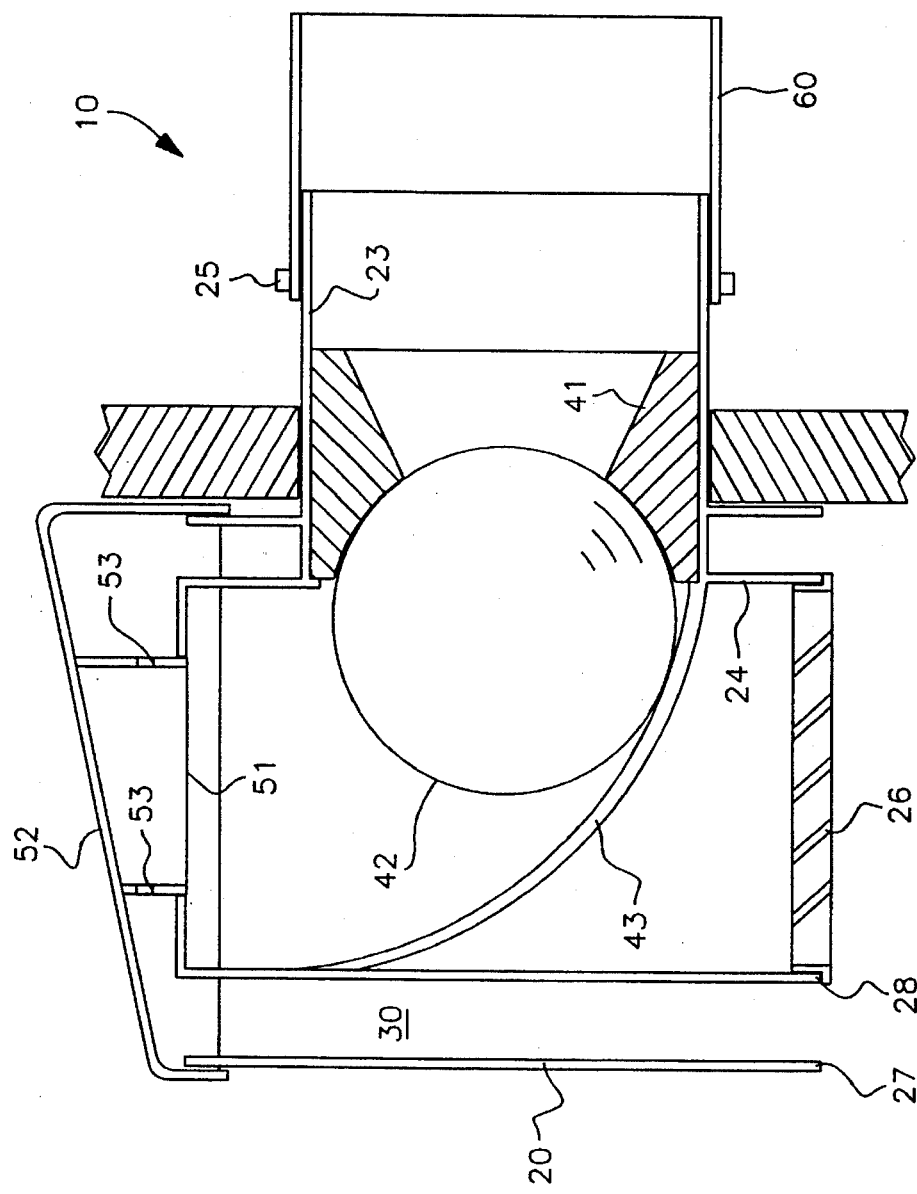
FIG. 1 is a cross-sectional view of a valve for a discharge air duct according to the present invention and illustrating the ball in the first position.
Figure 2:
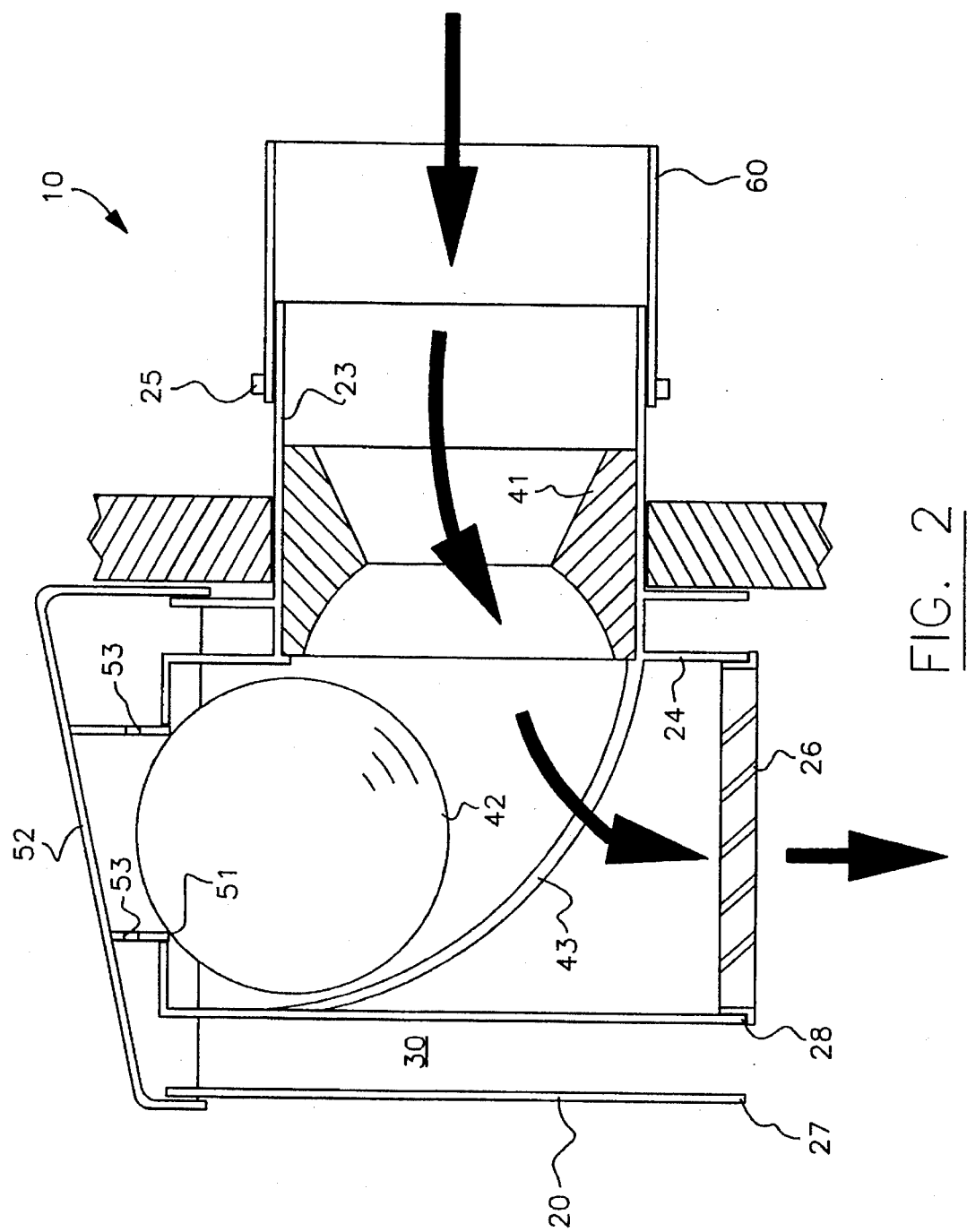
FIG. 2 is the same view as FIG. 1, but illustrates the ball in the second position.
Figure 3:
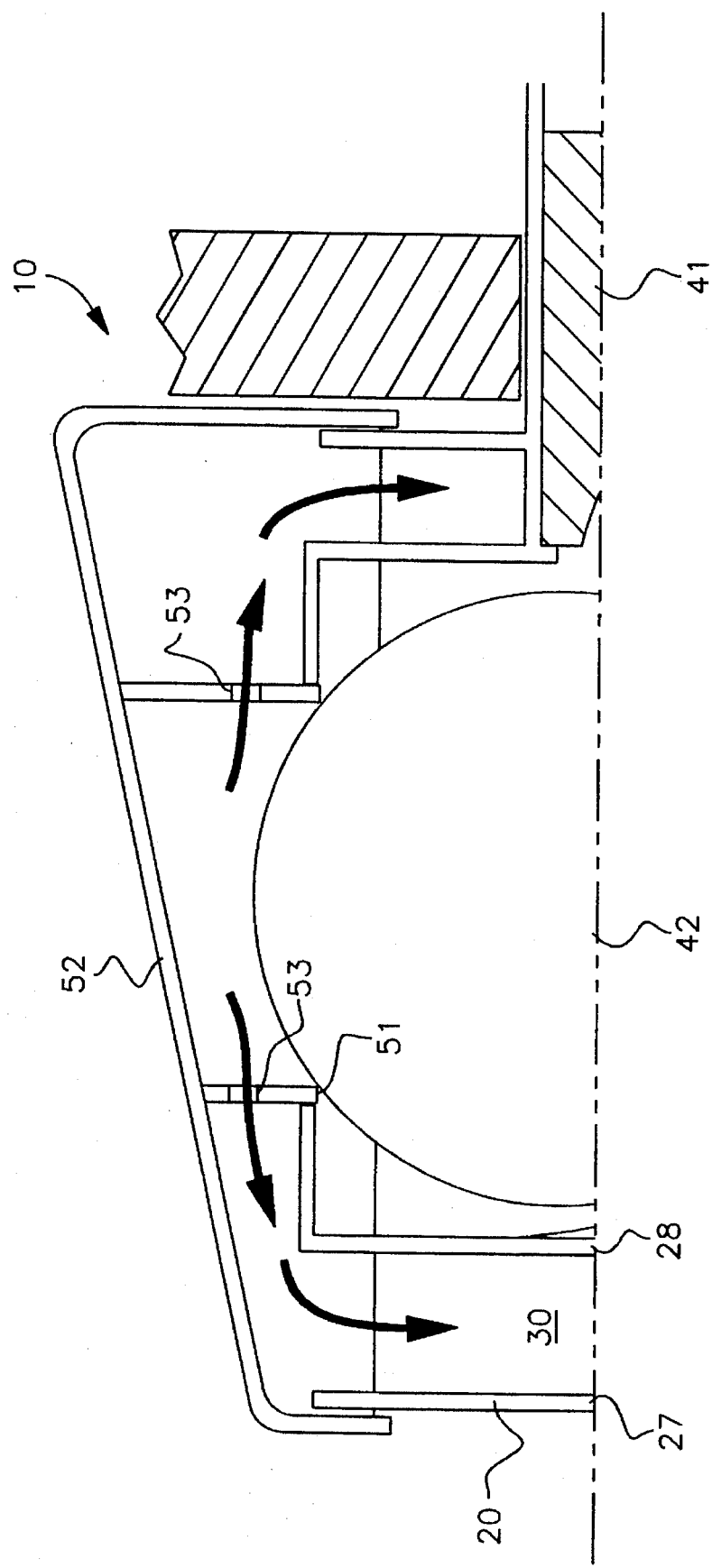
FIG. 3 is an enlargement of the upper part of FIG. 2.

FIGS. 1 to 3 illustrate a preferred embodiment of the valve 10 for a discharge air duct 60 which embodies the features of the present invention.

This valve 10 comprises a housing 20 which my be made with a plastic or metallic material. The housing 20 is provided with an air inlet 23, an air outlet 24, and a collar 25 for connecting the air inlet 23 to an end of the duct 60 such that the contaminated air evacuated from the domestic apparatus (not illustrated) may penetrate in the valve 10 through the air inlet 23. Any other means, such as pliers or screws, allowing to fix the air entry 23 to the duct 60 may also be used. The air outlet 24, through which the contaminated air is emerging after passing through the valve 10, is preferably provided with a removable protecting wire netting 26 preventing the access in the valve 10 to rodents or birds.

It is worth mentioning that the term "domestic apparatus" should be understood in its broad sense and that it is possible to use the present invention in an institutional, industrial or commercial context. The word "apparatus" is in fact any apparatus having a forced air outlet on which it is suitable to use the present invention. Moreover, in certain cases, it may be advantageous to install an additional duct (not illustrated), connected to the air outlet 24 for directing the air to another place.

The valve 10 comprises a shoulder 41 located inside the housing 20. The shoulder 41 is hermetically connected to the air inlet 23 such that all the air coming from the duct 60 passes therein.

The shoulder 41 is preferably ring-shaped and provided with two specific sections. The first section is cone-shaped for creating a narrowing. The second section is round-shaped for receiving the ball 42 therein. The round shape of the second section allows the ball 42 to hermetically lean thereon.

The ball 42 is movable between a first and a second position. While the domestic apparatus is off, the ball 42 is in the first position where it leans by gravity against the shoulder 41, as illustrated in FIG. 1.

As the apparatus is put on and that a contaminated air flow is propelled towards the valve 10, the contaminated air penetrates through the air inlet 23. At this moment, due to the contaminated air flow, as illustrated in FIG. 2, the ball 42 is moved towards the second position while following a guide 43. The guide 43 is curved towards the top such that the ball 42 is above the level of the first position while it is remote from the shoulder 41. The guide 43 has one of its ends attached to the box of the shoulder 41. The other end is attached to the interior surface of the housing 20. The guide 43, which may be two parallel stems, is made such that it interferes very little with the contaminated air flow.

When the operation of the apparatus is ended and that the contaminated air flow stops, the ball 42 goes back by itself to the first position for again lean against the shoulder 41. At the same time, the air contaminated surplus goes back to the apparatus, thereby creating a suction effect on the ball 42, and thus maintaining the ball 42 more firmly in the first position.

For a maximum reduction of the heat loss towards the exterior, the ball 42 and the shoulder 41 are preferably made of an insulating material, such as the polystyrene foam. However, it is not necessary that these elements be made with an insulating material if the difference of temperature between the interior and the exterior is always small.

For maintaining the ball 42 in the most possible stable manner in the second position under the effect of the contaminated air flow and thus preventing the movements and the rebounds of the ball 42, the valve 10 preferably comprises a seat 51 on which the ball 42 is leaning against while it is in second position 47. This ring-shaped seat 51 is provided with at least one opening 53 communicating with the exterior of the housing 20. As illustrated in FIG. 3, the ball 42 may be maintained stable in the second position because of the pressure differential created between the interior and the exterior of the seat 41, the pressure in the housing 20 being higher than the one inside.

The seat 51 is preferably located in a cover 52 hermetically adaptable to an upper opening of the housing 20. As illustrated in FIGS. 1 to 3, the housing 20 may be provided with a double wall comprising an exterior wall 27, an interior wall 28 and a passage 30 emerging beside the air outlet 24. The passage 30 allows the communication of the opening or openings 53 towards the exterior of the housing 20 beside the air outlet 24. It is also possible to provide a passage 30 without a cover 52. However, the cover 52 has the advantage of allowing an easy maintenance of the interior of the housing 20.

The valve 10 may be installed inside or outside the buildings and the housing 20 may advantageously be provided with a fastening system (not illustrated), such as screws, allowing to fix the housing to any surface, more particularly to the exterior wall of the building.

It is also possible to use the valve 10 with a contaminated air flow coming from the air outlet 24 and then inverting the inlet and the outlet illustrated in FIGS. 1 to 3. The ball 42 may then be blown towards the top to the second position under the effect of such contaminated air flow, and then allow the passage of the same through the valve 10. This is particularly advantageous for apartments where the exterior air outlets are very high and then not very accessible.

Although the best way for carrying out the invention has been described hereinabove and illustrated in the appended drawings, the invention is not restricted this only embodiment and by way of a preferred embodiment thereof, may be effected by a person skill in the art without departing from the scope or spirit of the invention.

I claim:

1. A valve for a domestic discharge air duct (60), the valve (10) comprising:

a housing (20) provided with an air inlet (23), an air outlet (24) and a means (25) for connecting the air inlet (23) to an end of the conduit (60);

a shoulder (41) located inside the housing (20) and in front of the air inlet (23);

a ball (42) movable between a first position where the ball (42) is leaning by gravity against the shoulder (41) in a substantially hermetical manner, and a second position where the ball (42) is removed from the shoulder (41) and above the first position;

a guide (43) set inside the housing (20) for guiding the ball (42) between the first and the second position; and a seat (51) on which the ball (42) is leaning against in the second position;

the valve (10) being characterized in that the ball (42) and the shoulder (41) are made of an insulating material, the ball (42) being moved towards the second position due to a pressure differential created by a passage (30) connecting the top of the seat (51) to an area surrounding the air outlet (24).

2. A valve as in claim 1, characterized in that the passage (30) is consisting of a double wall in the housing (20), the double wall comprising an outside wall (27) and an inside wall (28).

3. A valve as in claim 1 or 2, characterized in that the air outlet (24) is facing the bottom and is provided with a protecting wire netting (26).

* * * * *